(12) United States Patent
Pabon et al.

(10) Patent No.: US 9,443,504 B2
(45) Date of Patent: Sep. 13, 2016

(54) ACTIVE ATTENUATION OF VIBRATIONS RESULTING FROM FIRING OF ACOUSTIC SOURCES

(71) Applicant: SCHLUMBERGER TECHNOLOGY CORPORATION, Sugar Land, TX (US)

(72) Inventors: Jahir Pabon, Newton, MA (US); Gregoire Casoetto, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 570 days.

(21) Appl. No.: 13/736,724

(22) Filed: Jan. 8, 2013

(65) Prior Publication Data

US 2014/0192618 A1 Jul. 10, 2014

(51) Int. Cl.
*G10K 11/178* (2006.01)
*G01V 1/46* (2006.01)

(52) U.S. Cl.
CPC ........... *G10K 11/178* (2013.01); *G01V 1/46* (2013.01); *G10K 2210/122* (2013.01); *G10K 2210/129* (2013.01); *G10K 2210/3216* (2013.01)

(58) Field of Classification Search
CPC .................................. G01V 1/48; G01V 1/40
USPC ............................................... 367/76, 81–83
See application file for complete search history.

(56) References Cited

U.S. PATENT DOCUMENTS

| | | | |
|---|---|---|---|
| 4,594,691 A | 6/1986 | Kimball et al. | |
| 5,852,587 A | 12/1998 | Kostek et al. | |
| 6,671,224 B1 | 12/2003 | Pabon | |
| 6,741,185 B2 | 5/2004 | Shi et al. | |
| 6,837,332 B1* | 1/2005 | Rodney | G01V 1/48 181/5 |
| 6,899,197 B2 | 5/2005 | Arian et al. | |
| 7,839,148 B2 | 11/2010 | Vehra et al. | |
| 8,305,081 B2 | 11/2012 | Reiderman et al. | |
| 8,408,330 B2 | 4/2013 | Hutin et al. | |
| 2009/0230969 A1* | 9/2009 | Hall | G01V 11/002 324/343 |

OTHER PUBLICATIONS

International Search Report and Written Opinion of PCT Application No. PCT/US2013/069061 dated Feb. 17, 2014: pp. 1-14.

* cited by examiner

*Primary Examiner* — Luke Ratcliffe
(74) *Attorney, Agent, or Firm* — Bridget M. Laffey

(57) ABSTRACT

An acoustic logging tool is provided with a first acoustic source that generates an acoustic signal primarily directed into the formation, the acoustic signal including a noise signal carried axially along the tool, a second acoustic source adapted to generate a noise canceling signal along the tool that actively and significantly cancels the noise signal, and a plurality of acoustic sensors axially spaced from each other along the tool and spaced from the first acoustic source and the second acoustic source. The acoustic sensors receive and record indications of pressure signals resulting from the acoustic signal and the noise canceling signal. The pressure signal indications may be processed in order to generate information regarding the formation.

21 Claims, 16 Drawing Sheets

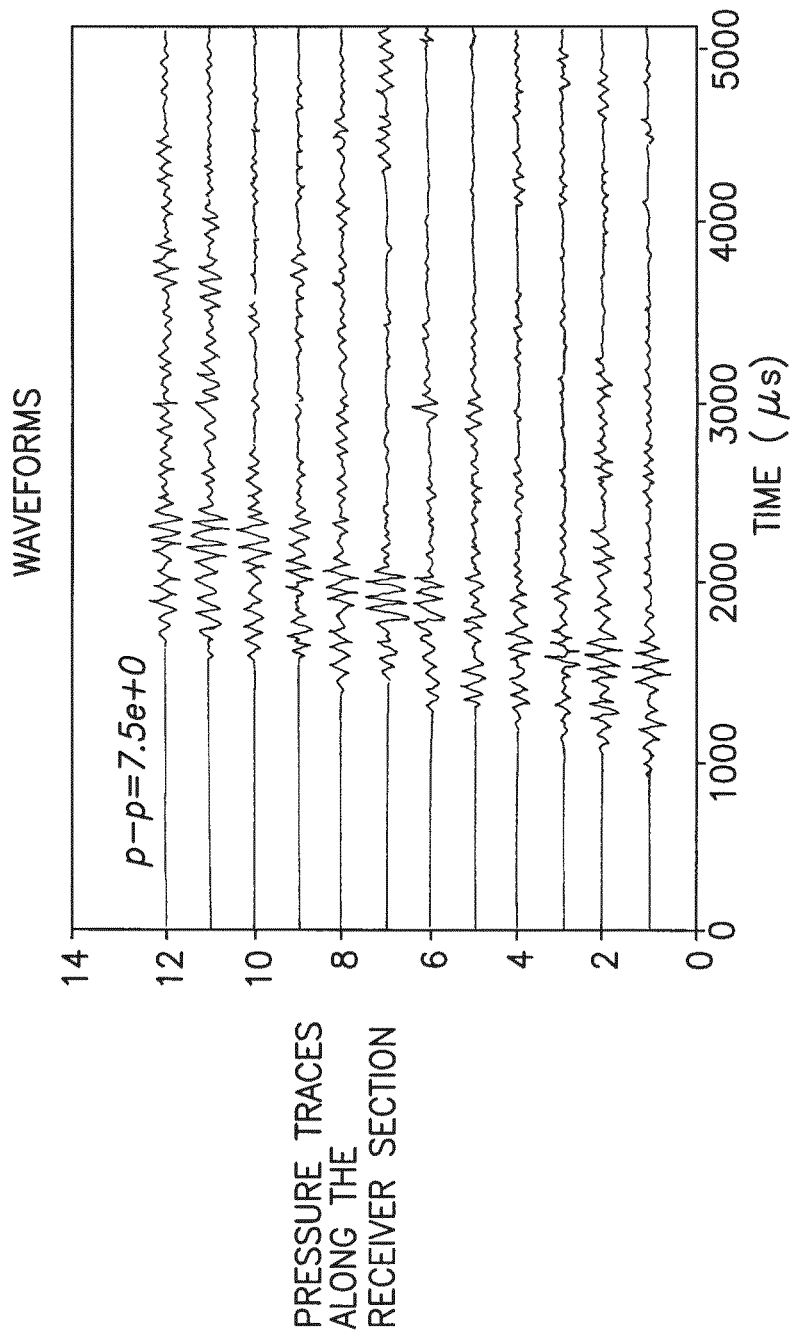

ACTIVE ATTENUATION OF VIBRATIONS RESULTING FROM FIRING OF ACOUSTIC SOURCES

FIELD

The subject disclosure relates to evaluation of a formation traversed by a borehole using sonic (acoustic) tools and associated methods. More particularly, the subject disclosure relates to apparatus and methods for active attenuation in an acoustic tool of vibrations caused by (resulting from) firing of acoustic sources. Although not limited thereto, this case has particular application to logging-while-drilling and measurement-while-drilling tools (collectively referred to hereinafter as "LWD" tools).

BACKGROUND

Sonic well logs are typically derived from a tool suspended in a borehole or well by a cable. The sonic tool will often have a sonic transmitter and a plurality of receivers. Typically, a sonic signal is transmitted from one longitudinal end of the tool and is received (detected) at the other end. The sonic signal from the transmitter enters the formation adjacent the borehole, and the arrival times are used to find formation parameters. Sonic measurements are taken every few inches as the tool is moved in the borehole or well. In an LWD tool, the measurements may be taken as the tool drills into the borehole or as the tool is tripped into or out of the borehole.

Various data processing techniques are known for taking the sonic measurements and generating useful information. As disclosed in co-owned U.S. Pat. No. 4,594,691 to Kimball et al., a "slowness time coherency" (STC) technique may be utilized to stack moveout-corrected receiver outputs by depth level and identify selected peaks of a coherence measure of the signal. The packets of coherent energy can then be identified in terms of their origin such as compressional, shear, Stoneley or other arrivals. Various logs such as a "slowness log" can be generated, and the slowness information can be used to provide information regarding formation parameters such as porosity.

One complication involved in making sonic measurements and generating useful information is the introduction of noise. It is known that the tool body itself introduces noise by conducting energy directly from the acoustic source to the detectors. In order to reduce the impact of noise, some wireline logging tools have been provided with slots, perforations or grooves in the tool housing so as to create a tortuous path for the sonic energy, thereby attenuating and/or slowing down the acoustic signal being transmitted by the housing. Other tools have mounted the transmitters and receivers on flexible material such as rubber or on other material whose acoustic velocity is slower than the housing material. For LWD tools, not only is noise introduced by the direct path of the housing, but considerable noise (interference) is introduced by the interaction of the drill bit with the formation. In order to reduce the noise, and as disclosed in co-owned U.S. Pat. No. 5,852,587 to Kostek et al., acoustic energy is transmitted preferentially at or near a "stop band" frequency. In addition, a plurality of axially periodic, substantially circumferentially continuous sections of the drill collar with acoustic propagation characteristics different from the drill collar may be provided in such a manner that the acoustic energy at a stop band frequency is further attenuated or filtered through a combination of reflection and destructive interference.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, an acoustic logging tool is provided with a collar, a first acoustic source on the collar, a plurality of acoustic sensors spaced from said acoustic source on the collar, and a second acoustic source on the collar, with the second acoustic source adapted to actively cancel collar vibrations introduced by the first acoustic source. In one embodiment, the acoustic logging tool may be further provided with a collar vibration sensor adapted to measure the velocities of signals from the first and second acoustic sources. In one embodiment, a collar vibration sensor is located between the second acoustic source and the acoustic sensors.

In one embodiment, the first acoustic source is adapted to direct its energy radially into the formation, and the second acoustic source is adapted to direct its energy axially.

According to one embodiment, the second acoustic source that is adapted to actively cancel the collar vibrations introduced by the first acoustic source is located between the first acoustic source and the acoustic sensors.

In one embodiment, based on a combination of computer simulations and calibration experiments, a desirable canceling signal is found and used when running the tool in a borehole. During use, the primary acoustic source and the second canceling source are fired, and the pressure traces are recorded by the sensors. Data processing is performed on the data recorded by the sensors in order to determine properties of the formation surrounding the borehole.

In another embodiment, computer simulations and calibration experiments are run for a range of rock compressional slownesses (e.g., fast, intermediate, slow and optionally extra-slow rocks) the tool is expected to encounter and a different desirable canceling signal is determined for each. In a further embodiment, the computer simulations and calibration experiments are run for (2D) combinations of the range of rock compressional slownesses, and for the properties of drilling mud likely to be used (e.g., by way of example only, water based mud, oil based mud, and optionally extra heavy mud). In yet a further embodiment, the computer simulations and calibration experiments are run for (3D) combinations of different ranges of rock compressional slownesses, different drilling muds and different borehole diameters in which the tool might be run. The second canceling source is chosen to provide one of the different desirable canceling signals based on the simulations and calibration experiments conducted.

In another embodiment, the second acoustic source provides a plurality of second acoustic signals adapted to actively cancel the collar vibrations, with each second acoustic source signal specifically chosen to relate to the expected formation characteristics and/or drilling mud properties and/or different borehole diameters. When the tool is run in a particular borehole with known drilling mud properties, and at a location in the formation with an expected compressional slowness, the particular acoustic source signal adapted for that combination is used for cancelation purposes. When, in the same borehole with the same mud, the tool is at a location where the compressional slowness enters a different range, a different particular acoustic source signal adapted for that different combination is used for cancelation purposes. The same tool may be used in different boreholes having different diameters and with different muds, and a different second acoustic source signal may be selected to be fired to cancel the collar vibration signal induced by the first acoustic source.

In one embodiment the vibrational canceling source is fired simultaneously with the first acoustic source. For purposes herein, the term "substantially simultaneously" should be understood to mean within ten microseconds. In another embodiment, the vibrational canceling source is fired either before or after the first acoustic source, e.g., 10 milliseconds apart, and the pressure and optionally velocity traces for the sources are separately recorded at the receivers. The traces are then processed, e.g., by adding (subtracting) them together, either downhole or uphole to provide combined signals that may be processed in order to determine properties of the formation surrounding the borehole.

In one aspect, the second acoustic source which is adapted to actively cancel collar vibrations induced by the first acoustic source is provided in addition to slots, perforations, or grooves in the tool housing that are used to create a tortuous path for the sonic energy and a mounting of the first acoustic source and receivers on flexible material such as rubber or other material whose acoustic velocity is slower than the housing material.

BRIEF DESCRIPTION OF THE DRAWINGS

FIG. 9b is a plot of the slownesses calculated using slowness time coherence processing for the data of FIG. 9a.

FIG. 11a is a graph of pressure traces along a receiver section of an acoustic borehole tool as simulated by a computer for a first acoustic source and a second "generic" canceling acoustic source in a borehole of a "fast" formation of known density, shear slowness and compressional slowness.

FIG. 11b is a plot of the slownesses calculated using slowness time coherence processing for the data of FIG. 11a.

FIG. 12b is a plot of the slownesses calculated using slowness time coherence processing for the data of FIG. 12a.

FIG. 13b is a plot of the slownesses calculated using slowness time coherence processing for the data of FIG. 13a.

DETAILED DESCRIPTION

Figure 1:
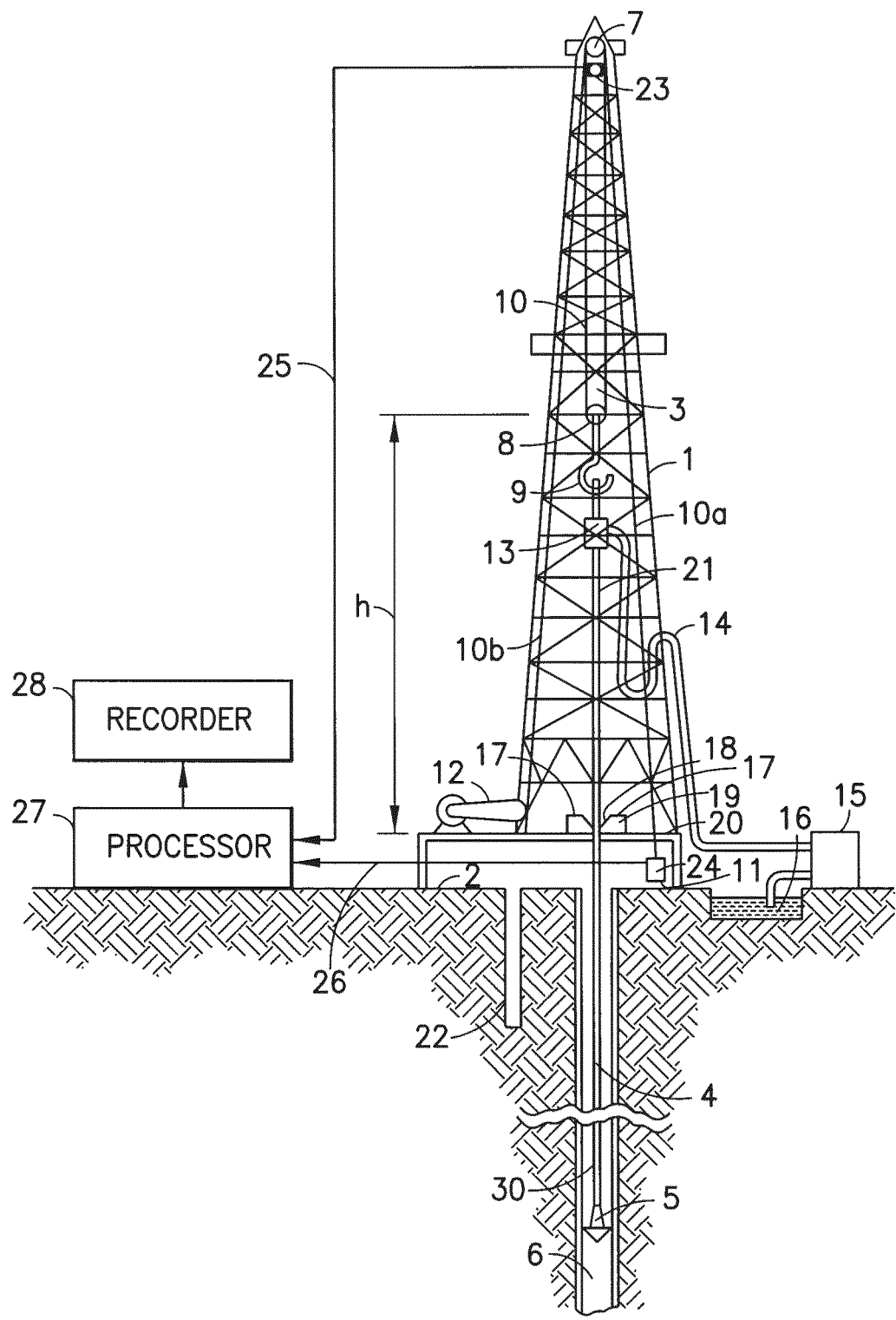
FIG. 1 is a general illustration of a drilling rig and drill string with a downhole acoustic logging borehole tool incorporated into the drill string.

FIG. 1 is a general illustration of a drilling rig and a drill string with a downhole acoustic logging tool in a borehole. A rotary drilling rig shown includes mast 1 rising above ground 2. The rig is fitted with lifting gear 3 from which is suspended drill string 4 formed of drill pipes screwed one to another. A drill bit 5 is located at the lower end of the rig and is provided for drilling the well 6. Lifting gear 3 includes a crown block 7, the axis of which is fixed to the top of mast 1, vertically travelling block 8, to which is attached hook 9, cable 10 passing round blocks 7 and 8 and forming, from crown block 7, on one hand dead line 10a anchored to fixed point 11, and on the other active line 10b which winds round the drum of winch 12.

Drill string 4 is suspended from hook 9 by means of swivel 13 linked by hose 14 to mud pump 15, which permits the injection of drilling mud into well 6 via the hollow pipes of drill string 4. The drilling mud may be drawn from mud pit 16 which may be fed with surplus mud from well 6. The drill string may be elevated by turning lifting gear 3 with winch 12 and the drill pipes may be successively removed from or added to well 6 and unscrewed in order to remove bit 5. These drill pipe raising and lowering operations require drill string 4 to be temporarily unhooked from lifting gear 3. The drill string 4 is then supported by blocking it with wedges 17 in conical recess 18 in rotating table 19 mounted on platform 20 through which the drill string passes. The lowermost portion of the drill string may contain one or more tools, as shown at 30 for investigating downhole drilling conditions or investigating the properties of the geological formations penetrated by the bit and borehole 6. Tool 30 as described in more detail hereinafter is an acoustic logging tool having at least two transmitters and a plurality of receivers spaced therefrom.

Variations in height h of travelling block 8 during drill string raising operations are measured by means of sensor 23 which may be an angle of rotation sensor coupled to a faster pulley of crown block 7. Weight F applied to hook 9 of travelling block 8 may also be measured by means of strain gauge 24 inserted into dead line 10A of cable 10 to measure its tension. Sensors 23 and 24 are connected by lines 25 and 26 to processing unit 27 which processes the measurement signals and which incorporates a clock. Recorder 28 is connected to processing unit 27, which may constitute a computer.

Figure 2:
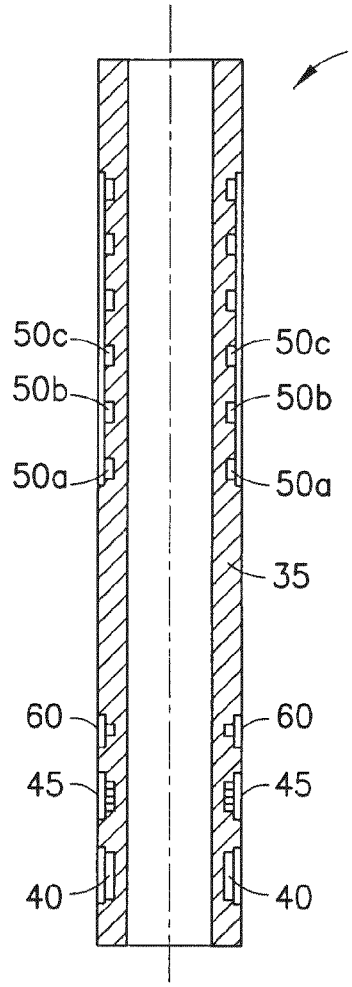
FIG. 2 is a cross-sectional diagram of a collar wall of an acoustic borehole tool.

In one embodiment, the borehole tool 30 may include a collar 35 with a wall as seen in the schematic diagram of FIG. 2. In one embodiment, a first (primary) acoustic source 40, a second (canceling) source 45, and a plurality of acoustic sensors 50a, 50b, 50c, . . . are located on the collar 35. In one embodiment, the second source 45 is provided between the first acoustic source 40 and the acoustic sensor 50a. In one embodiment, a collar vibration sensor 60 is also located on the collar and is provided between the second source 45 and the acoustic sensor 50a. The collar vibration sensor may be an accelerometer that can record the collar vibrations caused by the firing of one or both of sources 40 and 45.

Figure 3:
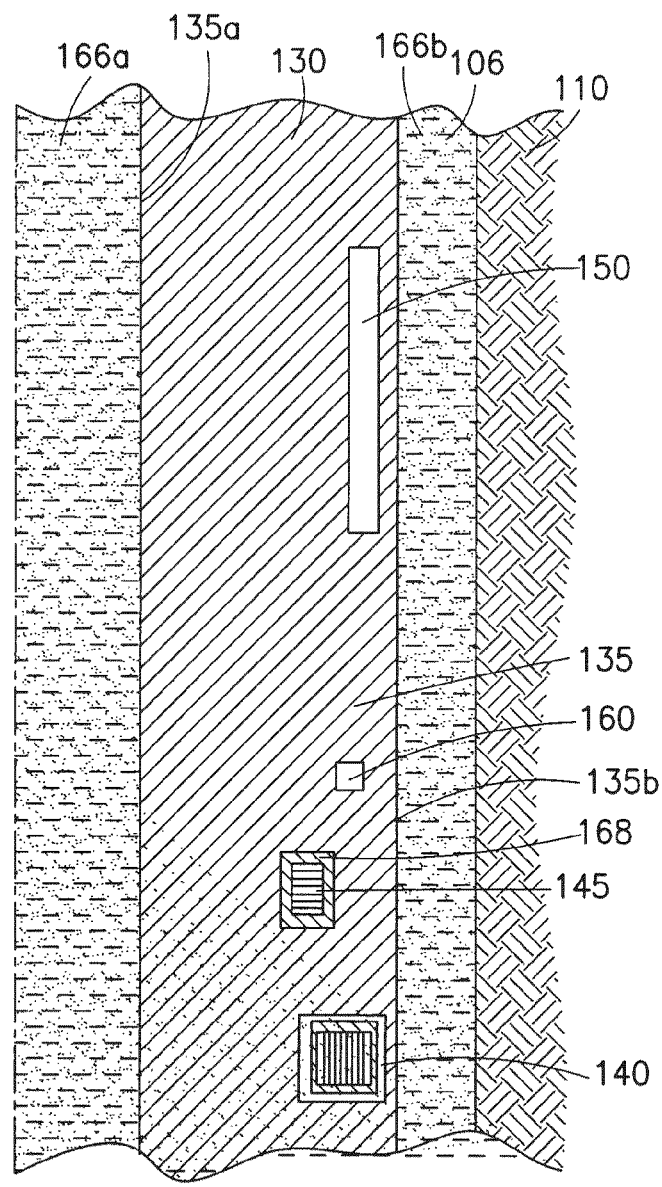
FIG. 3 is cross-section of one side of a portion of an acoustic borehole tool.

Turning to FIG. 3, a partial cross-section of a portion of an acoustic LWD borehole tool 130 is seen in a borehole 106 traversing a rock formation. The borehole 106 contains mud 166b external the tool 130. The borehole tool 130 is shown with a collar 135 having inner wall 135a and outer wall 135b. The collar 135 is typically made from steel. Mud 166a is also shown internal the collar 135 as the mud travels down to the drilling bit (not shown) of the tool 130. As seen in FIG. 3, cavities are provided in the collar 135 to contain a first (primary) acoustic source 140, a second (canceling) acoustic source 145, a receiver section 150 with multiple receivers, and a vibration (velocity or acceleration) sensor 160. In one embodiment, the first acoustic source 140 is separated from the outer wall 135b of the collar by a thin shield that optionally includes windows for increasing the transparency of the collar and the second acoustic source 145 is set back from the outer wall 135b by a thicker shield. The thicker shield may include a fiberglass cage 168 directly in contact with the steel collar 135. In one embodiment, the first acoustic source 140 is polarized so that its signal is directed primarily in the radial direction (toward the formation as opposed to along the tool). In one embodiment, the second acoustic source 145 is polarized so that its signal is directed primarily in the axial direction (along the tool as opposed to toward the formation). In one embodiment, the acoustic sources and receivers are ring elements or multiple elements extending around the circumference of the tool.

Receiver section 150 contains a plurality of receivers. By way of example only, and not by way of limitation, receiver section 150 may contain twelve receivers. In one embodiment, the inter-receiver distance is less than one half a wavelength of the sonic signal from the transmitter. For example, the inter-receiver distance may be less than 12 inches. By way of example only, and not by way of limitation, the inter-receiver distance may be between 4 and 8 inches. In one embodiment, the distance between the primary source 140 and the receiver section 150 is greater than the inter-receiver distance. By way of example only, and not by way of limitation, the distance between the primary source 140 and a closest receiver in the receiver section 150 is at least five feet.

In one embodiment, the second acoustic source 145 is axially located between the first acoustic source 140 and the receiver section 150. By way of example only, and not by way of limitation, the second acoustic source 145 may be placed approximately 1 foot away from the first acoustic source 140.

In one embodiment, the vibration (velocity or acceleration) sensor 160 is located axially between the second acoustic source 145 and the receiver section 150. By way of example only, and not by way of limitation, the vibration sensor 160 may be placed approximately 2 feet away from the second acoustic source 145.

As previously suggested, a purpose of providing a second acoustic source is to generate a signal that will act to cancel the (noise) signal from the first acoustic source traveling along the tool collar. According to one aspect, the signal of the second acoustic source is chosen to provide an effective canceling signal. One manner of choosing a second source is discussed hereinafter with reference to FIGS. 4-6.

Figure 4:
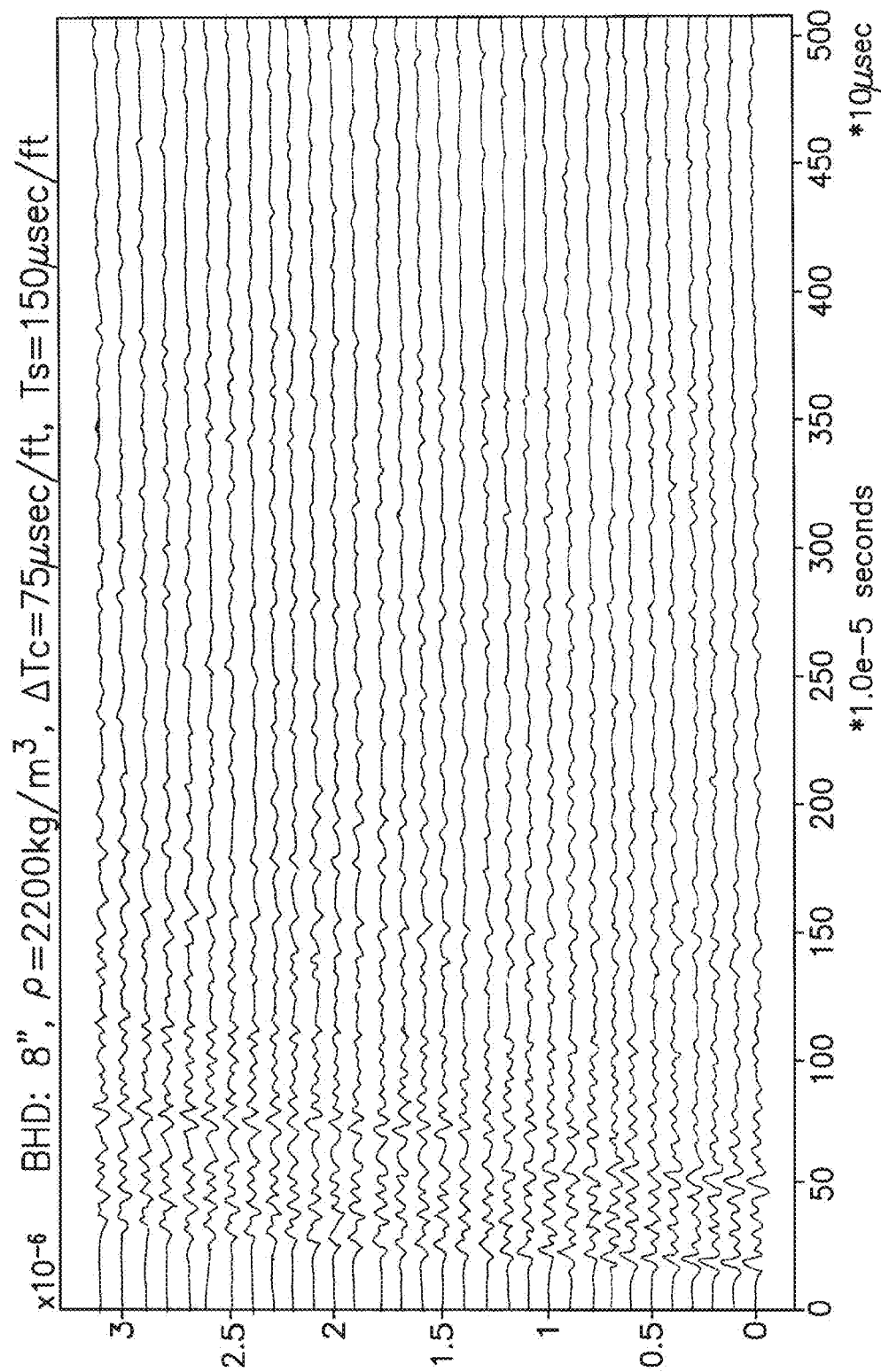
FIG. 4 is a plot of a computer simulation where a first acoustic source is fired and the axial velocity of resulting signal is detected at spaced intervals along the borehole tool.

FIG. 4 is a plot of a computer simulation of a first acoustic source being fired in an eight inch diameter borehole located in a formation having a compressional slowness of 75 microseconds/ft, a shear slowness of 150 microseconds/ft and a density of 2200 kg/m$^3$, where the axial velocity Vz of a resulting signal is detected at thirty-two spaced intervals along the borehole tool between the second source and the bottom of the receiver section. According to one aspect, it is desirable to generate a second signal from the second acoustic source that will optimally cancel the noise portion of the received signal; i.e., the portion of the signal that travels through the tool. From a control point of view, the second signal is found according to $V_i=V_i(S)+G_{C,Vi}*C$, where Vi is the velocity at each chosen location i (i=1, 2, . . . n), $V_i(S)$ is the velocity generated from the firing of the first source signal, C is the cancellation signal, and $G_{C,Vi}$ are impulse responses (Green's functions) for the cancellation signal; i.e., the velocities recorded at each of the chosen locations when the second (canceling) source is fired with an impulse signal (or a unit pulse, when using signals sampled at discrete time intervals). Impulse responses G can be computed through computer simulations using finite difference or finite element analyses, or can be measured directly by placing appropriate sensors on a tool prototype. In order to find an optimal value for C, the V, can be set to zero such that $V_i(S)+G_{C,Vi}*C=0$. An overconstrained set of linear equations of the type Ax=b results where x is the desired feed-forward signal, and a solution may be generated using well known optimization techniques. The dimensions of matrix A are (nt*n) rows and nt columns, where nt is the number of time samples in each velocity trace and n is the number of chosen locations where the velocity is to be "canceled;" i.e., set to zero. The length of vectors b is (nt*n), and the length of vector x (or C) is nt.

Figure 5:
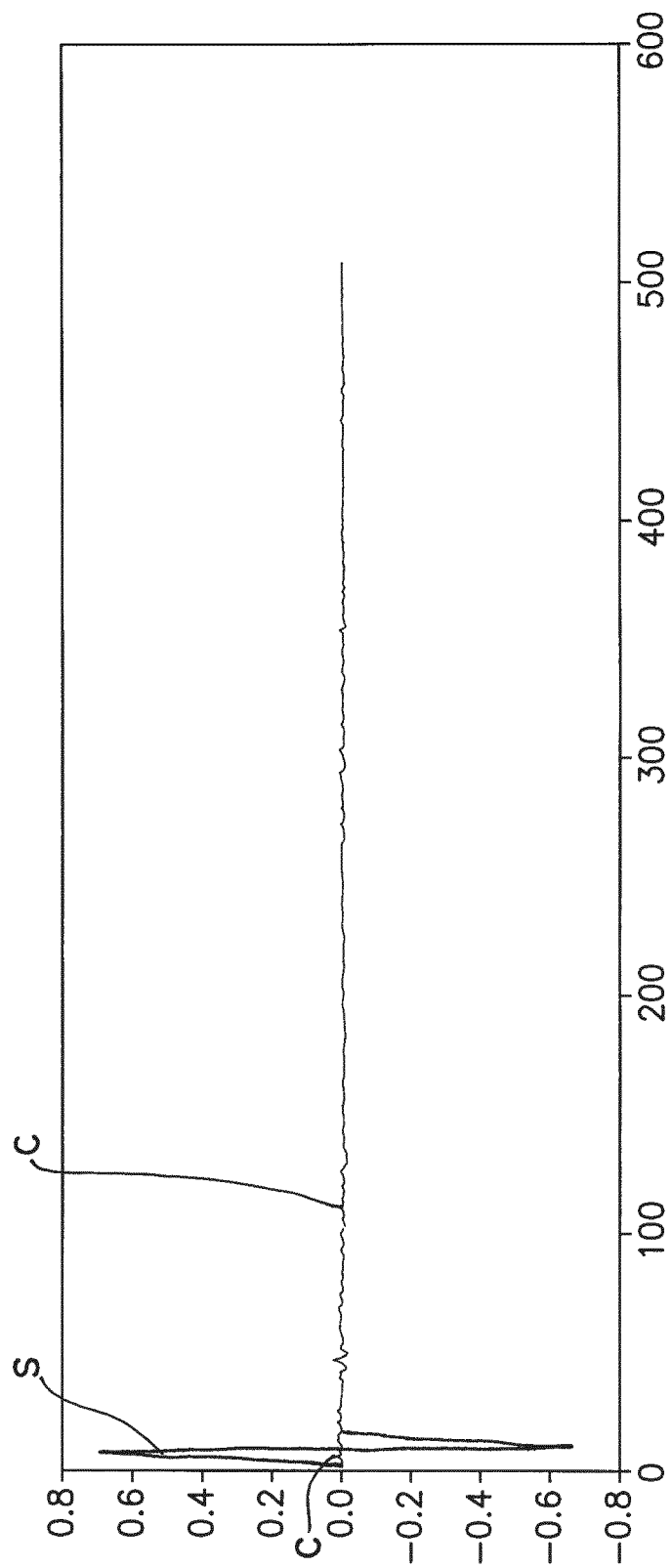
FIG. 5 is a plot of a first acoustic source signal and a second canceling acoustic signal.
Figure 6:
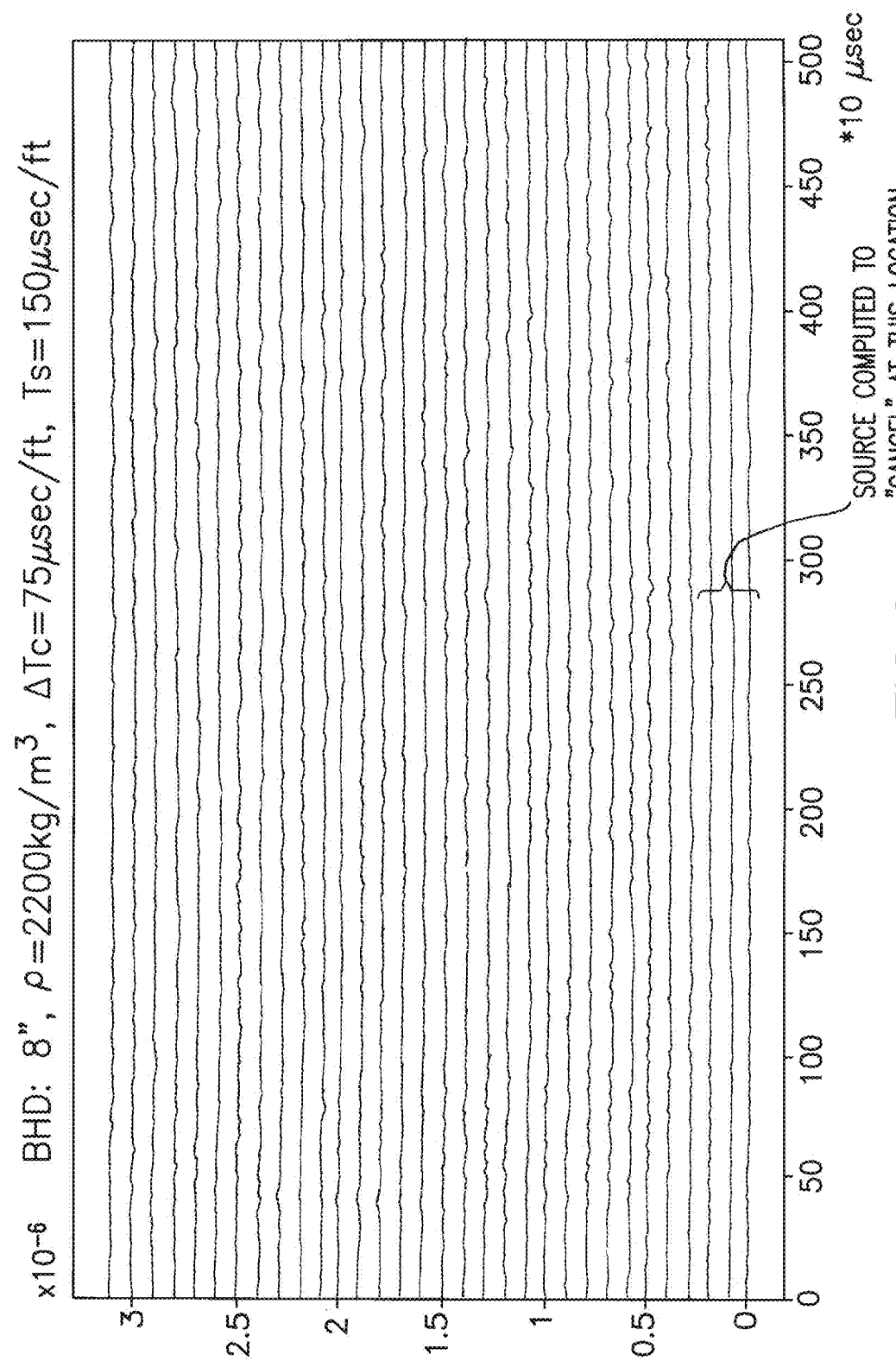
FIG. 6 is a plot of a computer simulation where the first acoustic source is fired and the second canceling acoustic source is fired, and the axial velocity waveforms are detected at spaced intervals along the borehole tool.

FIG. 5 is a plot of a first acoustic source signal S and the computed second canceling acoustic signal C resulting from the optimization (or the computation as described above). It is seen that the source signal S is a relatively large impulse signal, whereas the computed canceling signal C is a relatively small signal that continues for a relatively long period of time relative to the impulse signal S. As seen in FIG. 6 where the velocity Vz is measured at the same thirty-two locations as in FIG. 4, the firing of both sources results in a cancelation of much of the noise resulting from axial transmission of the source signal along the collar of the tool (compare FIG. 6 and FIG. 4). In particular, for the three locations nearest the second source, which in the example shown were the locations chosen to perform the cancellation (shown in the bottom three traces of FIG. 6), most of the noise is canceled. Predicted attenuation is approximately 28 dB.

Figure 7:
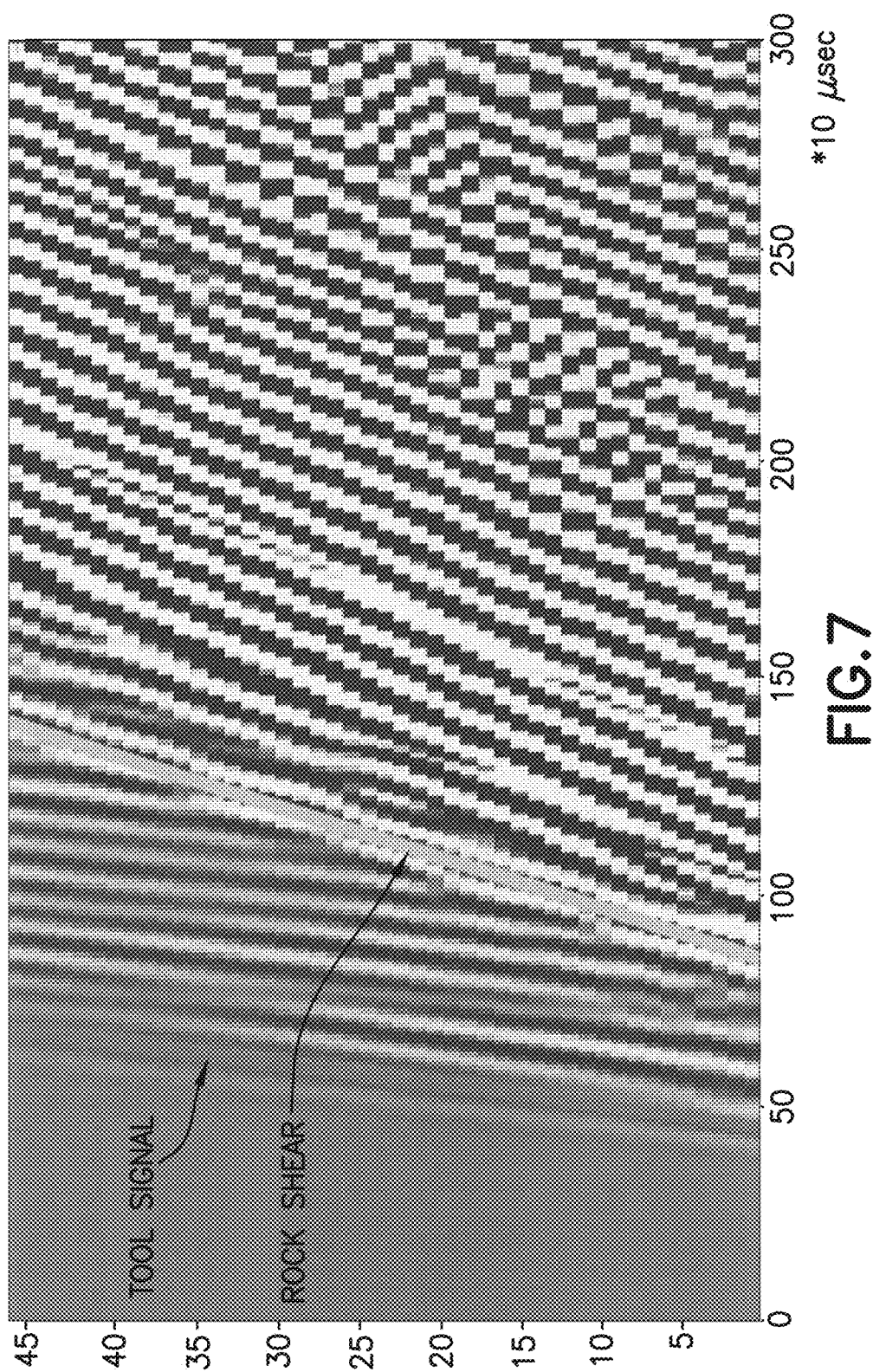
FIG. 7 is a pressure graph resulting from a computer simulation where a first acoustic source is fired in a borehole of a formation and the pressure is recorded at multiple pressure detectors of the acoustic borehole tool.
Figure 8:
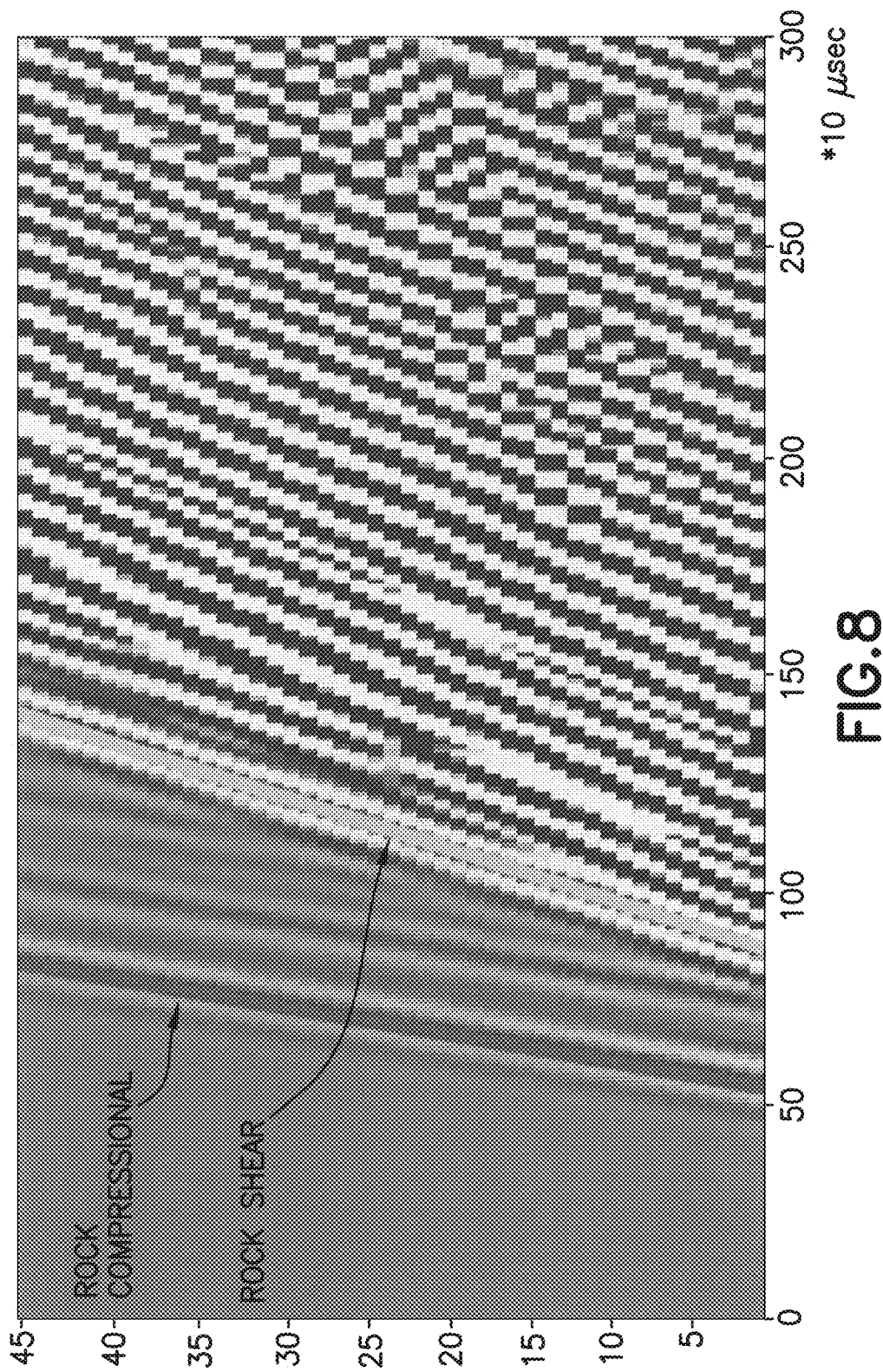
FIG. 8 is a pressure graph resulting from a computer simulation where both the first acoustic source and the second canceling acoustic source are fired in a borehole of a formation and the pressure is recorded at multiple pressure detectors of the acoustic borehole tool.

Turning now to FIGS. 7 and 8, simulated pressure graphs are shown. FIG. 7 is a pressure graph resulting from a computer simulation where the first acoustic source is fired in an eight inch diameter borehole located in a formation having a compressional slowness of 75 microseconds/ft, a shear slowness of 150 microseconds/ft and a density of 2200 kg/m$^3$, and the pressure is recorded at multiple pressure detectors (e.g., twelve spaced detectors) of the acoustic borehole tool; whereas FIG. 8 is a pressure graph resulting from a computer simulation where the first acoustic source and the second canceling acoustic source are both fired in the same borehole and the pressure is recorded at the multiple pressure detectors of the acoustic borehole tool. As is seen in FIG. 7 where only the main source is fired, the early collar vibration signal is a tool arrival (noise) signal (TOOL SIGNAL) that propagates at a speed of approximately 5000 meters/sec (or ~60 usec/ft). The rock shear signal (ROCK SHEAR) arrives later with a speed of approximately 2000 meters/sec. There is no noticeable rock compressional signal arrival in FIG. 7 because the rock compressional arrival is weaker than the collar arrival and therefore is not easily or properly extracted. On the other hand, as seen in the FIG. 8 simulation, where both the main source and canceling source were fired, the early collar vibration signal is essentially absent, and the rock compressional (ROCK COMPRESSIONAL) arrival is clearly observable with a speed of approximately 4000 meters/sec. The rock shear signal (ROCK SHEAR) is also seen with a speed of approximately 2000 meters/sec.

Figure 9A:
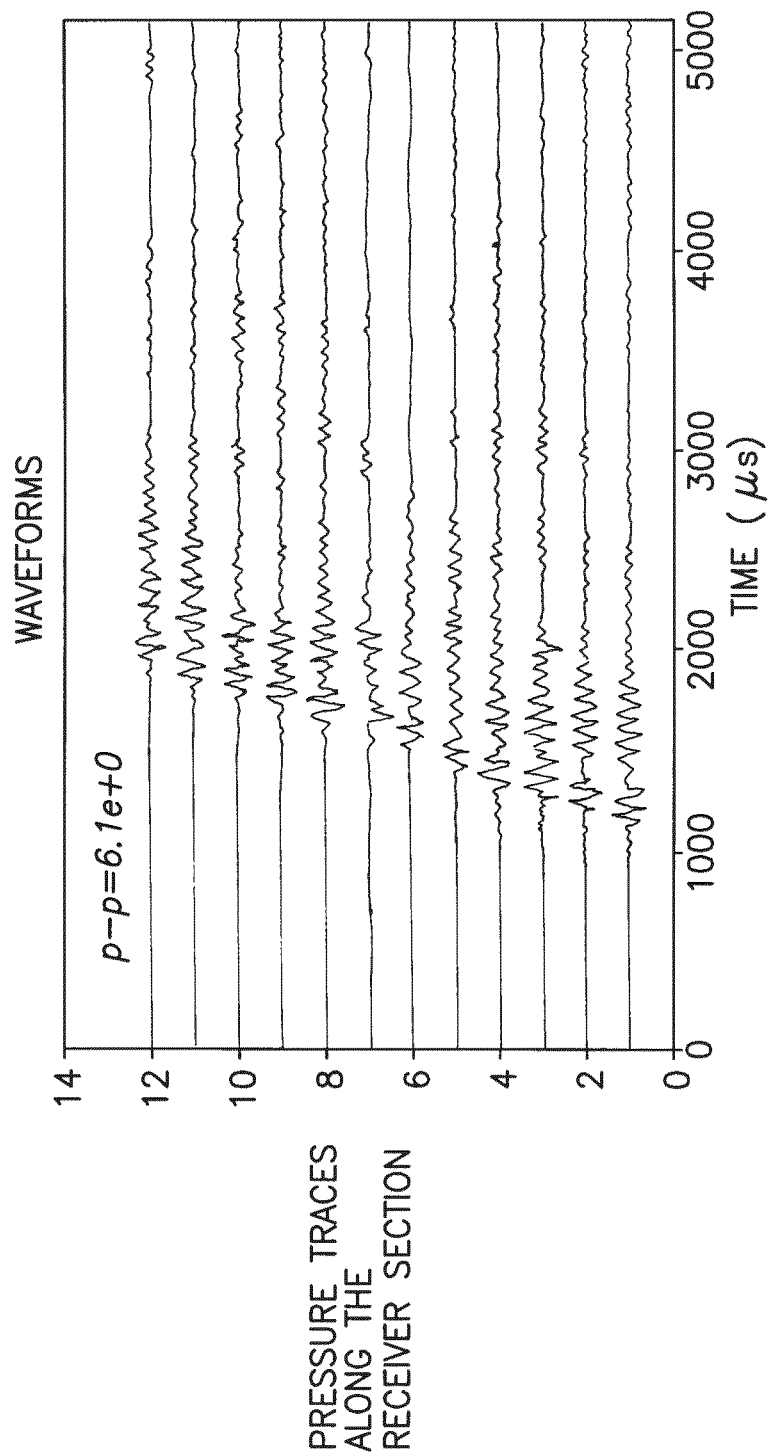
FIG. 9a is a graph of pressure traces along a receiver section of an acoustic borehole tool as simulated by a computer for a first acoustic source and a second canceling acoustic source in a borehole of a formation of known density, shear slowness and compressional slowness.
Figure 9B:
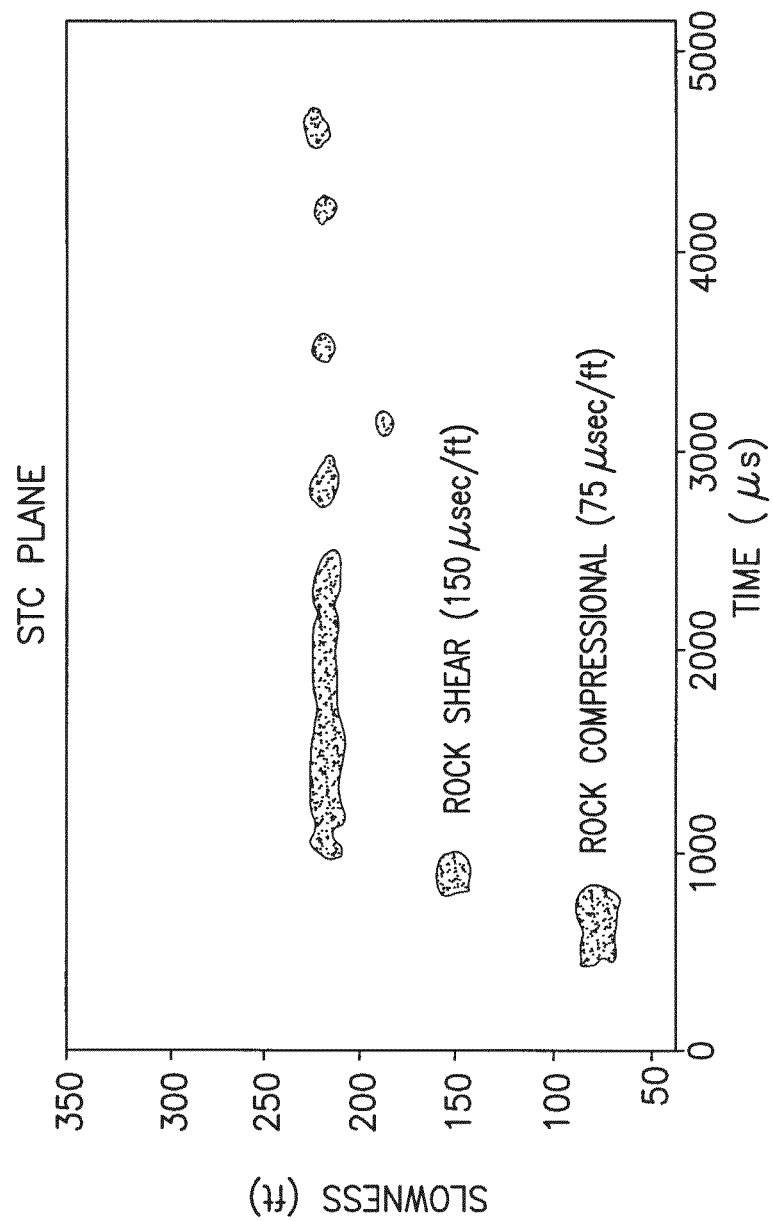

FIG. 9a is a graph of pressure traces along a receiver section of an acoustic borehole tool as simulated by a computer for a first acoustic source and a second canceling acoustic source in an eight inch borehole of a formation having a density of 2200 kg/m$^3$, shear slowness of 150 microseconds/ft and a compressional slowness of 75 microseconds/ft. With the pressure traces of FIG. 9a, using slowness time coherence (STC) processing, a plot of slowness versus time is generated as seen in FIG. 9b. As shown in FIG. 9b, the compressional slowness of the formation rock is calculated at approximately 75 microseconds/ft, and the shear slowness of the formation rock is calculated at approximately 150 microseconds/ft. A third (unmarked) signal calculated by the STC process corresponds to the Stoneley wave (a borehole mode whose speed depends on combined properties of the formation and the fluid in the borehole).

FIGS. 4-9b show that a second canceling source signal provides enhanced results when the acoustic properties of the rock is known in advance and the canceling source is chosen based on that knowledge. FIGS. 10-13b shows the advantageousness of providing the second canceling source when the acoustic properties of the rock are not known in advance.

Figure 10:
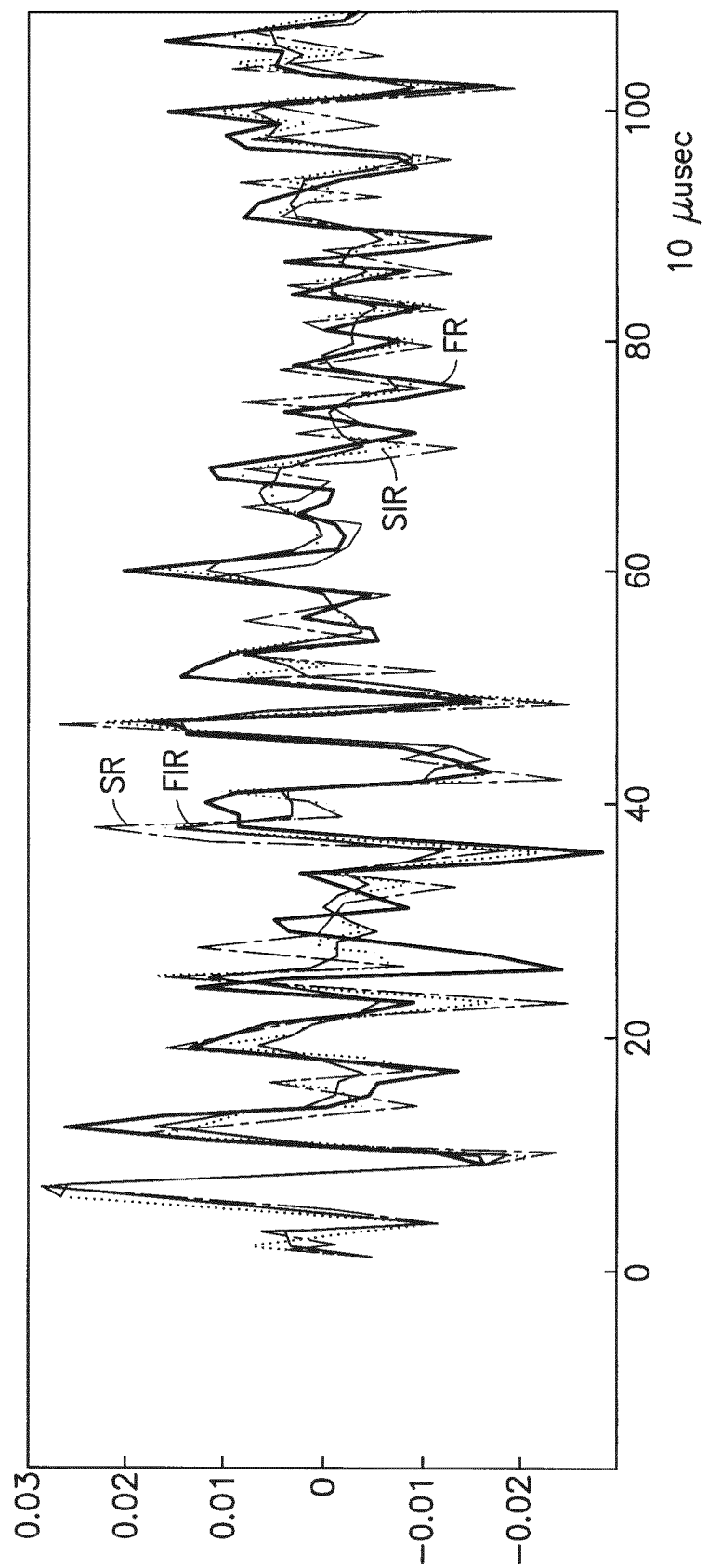
FIG. 10 is a plot showing optimal canceling signals computed for rocks of different slownesses.

FIG. 10 is a plot showing optimal canceling signals computed for rocks of different slownesses. Thus, optimal signals are seen for fast rocks FR (compressional slowness=50 microseconds/ft), two intermediate rocks FIR, SIR (compressional slownesses=75 and 90 microseconds/ft), and slow rocks SR (compressional slowness=100 microseconds/ft). Although there are clear differences, there is also a significant amount of commonality, especially on the early part of the signals. In one embodiment, a weighted sum of the four signals is computed and is used in computer simulations of the tool in boreholes traversing formations of different acoustic properties and as discussed hereinafter with respect to FIGS. 11a-13b. The weighted sum is considered a "generic" canceling signal. The weighted sum may be a plain average. Alternatively, simulations may be run using the plain average as the cancelling signal and an optimization procedure such as a gradient descent approach may be used to find a best set of weights that result in a minimal collar vibration amplitude for the four signals. In other embodiments, fewer or more rock types may be used in finding a "generic" canceling signal.

Figure 11B:
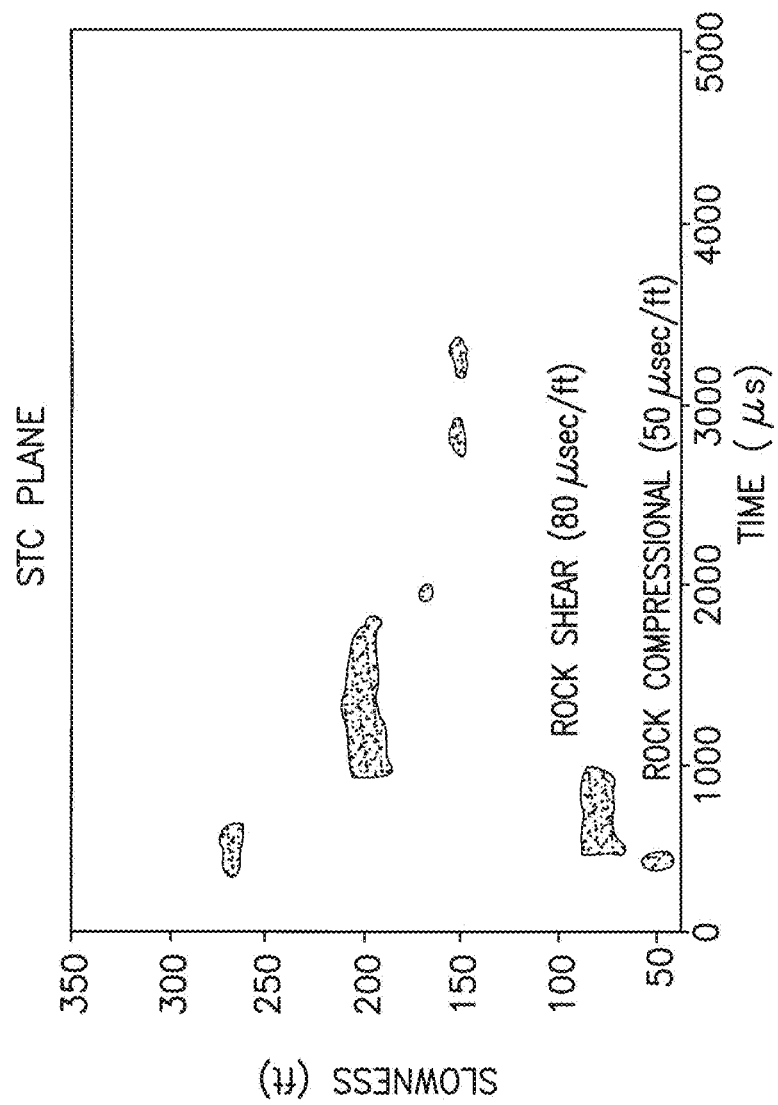

FIG. 11a is a graph of pressure traces along a receiver section of an acoustic borehole tool as simulated by a computer for a first acoustic source and a second "generic" canceling acoustic source generated from the data of FIG. 10 in an eight inch borehole of a "fast" formation having a compressional slowness of 50 microseconds/ft, a density of 2500 kg/m$^3$ and a shear slowness of 80 microseconds/ft. The results of STC processing are seen in FIG. 11b, where the rock compressional slowness of 50 microseconds/ft and rock shear slowness of 80 microseconds/ft are clearly visible.

Figure 12A:
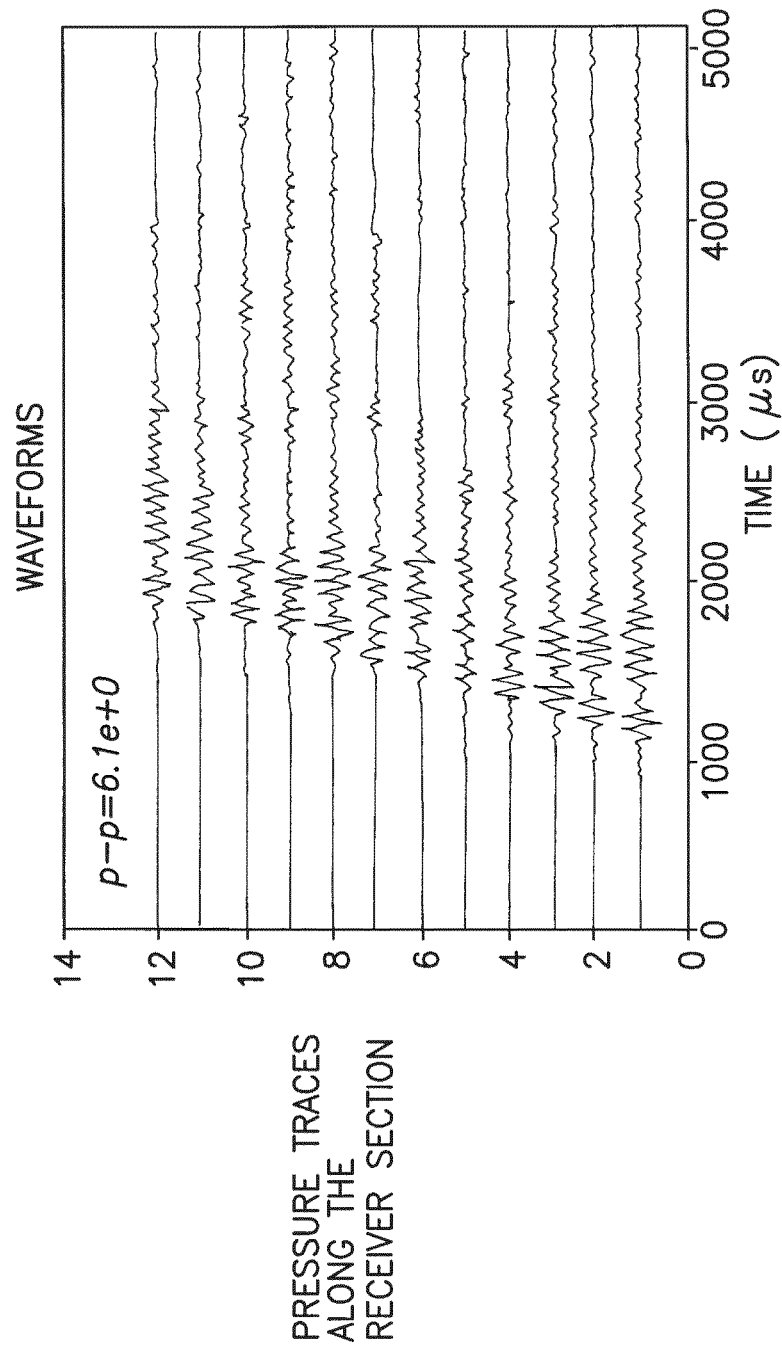
FIG. 12a is a graph of pressure traces along a receiver section of an acoustic borehole tool as simulated by a computer for a first acoustic source and a second "generic" canceling acoustic source in a borehole of an "intermediate" formation of known density, shear slowness and compressional slowness.
Figure 12B:
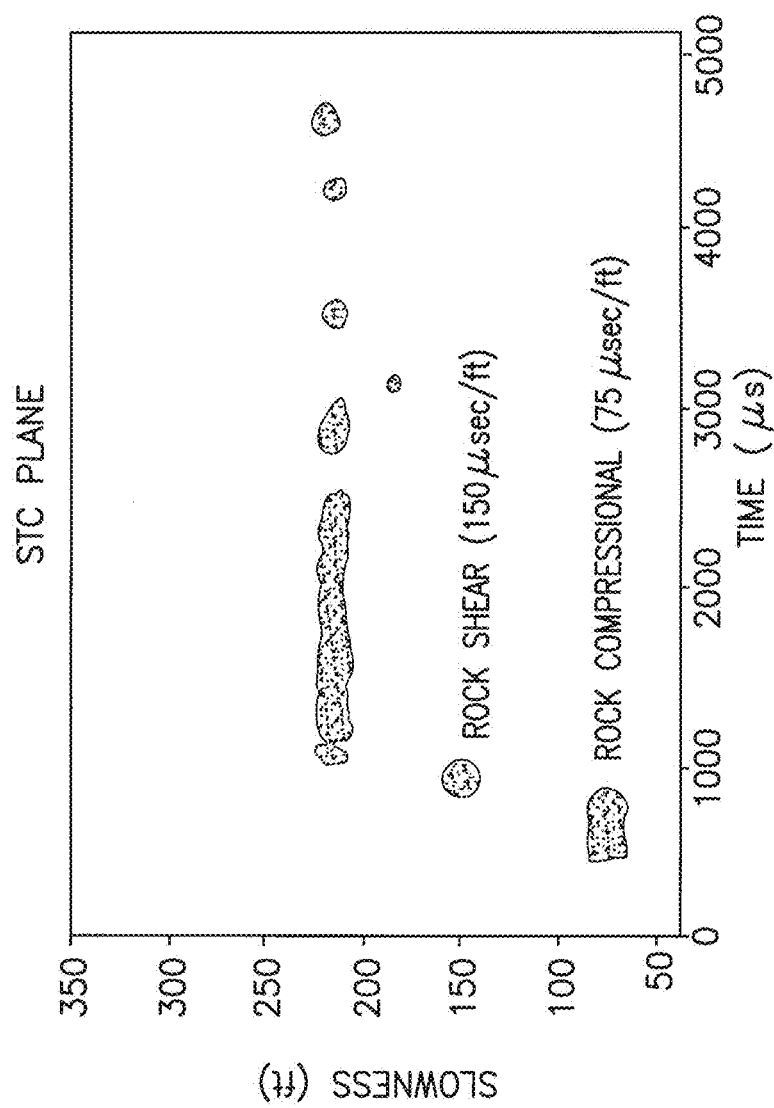

FIG. 12a is a graph of pressure traces along a receiver section of an acoustic borehole tool as simulated by a computer for a first acoustic source and a second "generic" canceling acoustic source generated from the data of FIG. 10 in an eight inch borehole of an "intermediate" formation having a compressional slowness of 75 microseconds/ft, a density of 2200 kg/m$^3$, and a shear slowness of 150 microseconds/ft. The results of STC processing are seen in FIG. 12b, where the rock compressional slowness of 75 microseconds/ft and rock shear slowness of 150 microseconds/ft are clearly visible.

Figure 13A:
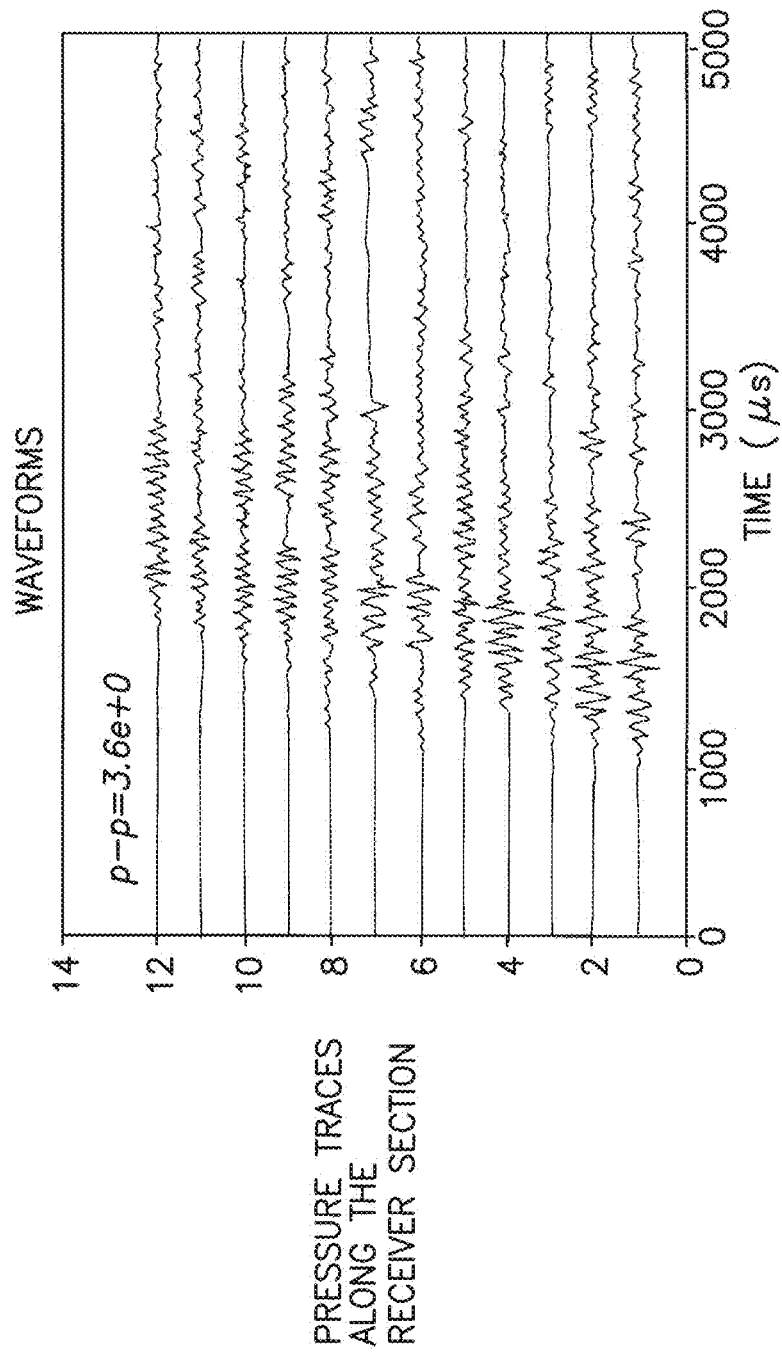
FIG. 13a is a graph of pressure traces along a receiver section of an acoustic borehole tool as simulated by a computer for a first acoustic source and a second "generic" canceling acoustic source in a borehole of a "slow" formation of known density, shear slowness and compressional slowness.
Figure 13B:
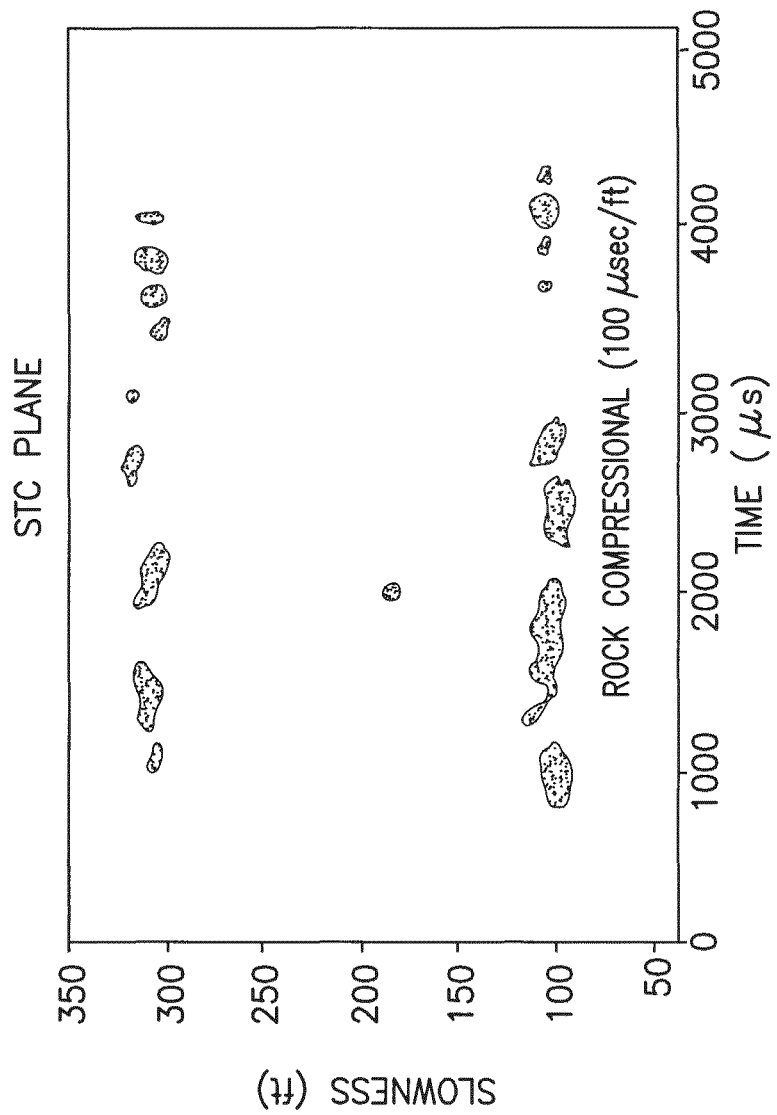

FIG. 13a is a graph of pressure traces along a receiver section of an acoustic borehole tool as simulated by a computer for a first acoustic source and a second "generic" canceling acoustic source generated from the data of FIG. 10 in an eight inch borehole of a "slow" formation having a compressional slowness of 100 microseconds/ft, a density of 2000 kg/m$^3$, and a shear slowness of 300 microseconds/ft. The results of STC processing are seen in FIG. 13b, where the rock compressional slowness of 100 microseconds/ft is clearly visible. Also seen in FIG. 13b is a Stoneley arrival at approximately 310 milliseconds/ft, rather than the shear slowness, as the shear slowness arrival generally cannot be detected when the shear slowness of the formation is slower than the slowness of the borehole fluid. In such situations, dipole or quadrupole sources may be used to measure the shear slowness.

FIGS. 11a-13b clearly confirm that even where a "generic" second canceling signal is generated as opposed to a signal formulated for a formation of known characteristics, the "generic" signal is still effective in reducing noise so that an accurate determination of formation slownesses can be generated for a wide range of formations.

According to one embodiment, a method is provided where based on computer simulations and calibration experiments, a single desirable or optimized canceling signal for the second acoustic source is found for a borehole tool, and the second acoustic source is adapted to generate that canceling signal. When the tool is in the borehole, the primary acoustic source and the appropriate second canceling acoustic source are fired, and the resulting pressure signals are recorded by a plurality of axially spaced detectors. The signal information is then processed, e.g., using Slowness Time Coherency processing, to obtain information regarding the property of the formation (rock) in which the tool is being run. Optionally, the tool may include a vibration or velocity or acceleration sensor (e.g., an accelerometer) that records velocity information each time the first and second acoustic sources are fired. The information recorded from the velocity sensor may be used to periodically recalibrate (i.e., change) the output from the second acoustic source.

In one embodiment a method is provided where based on computer simulations and calibration experiments, a plurality of desirable or optimized canceling signals are found, at least one each for a plurality of different rock compressional slownesses expected to be encountered by the borehole tool. For example, the formation slownesses expected to be encountered can be broken into two, three, four or more ranges, and a desirable canceling signal can be generated for each range. During use, the first source and the selected second acoustic source (based on an estimate of adjacent formation slowness from other information such as adjacent wells or previously drilled segments of the borehole) are fired, and the resulting pressure signals are recorded by a plurality of axially spaced detectors. The signal information is then processed, e.g., using Slowness Time Coherency processing, to obtain information regarding the property of the formation (rock) in which the tool is being run. It should be appreciated that as the tool is run in the borehole, the choice of the appropriate second canceling acoustic source signal can be changed based on known information or based on the results obtained. Optionally, the tool may include a vibration or velocity or acceleration sensor (e.g., an accelerometer) that records velocity information each time the first and second acoustic sources are fired. The information recorded from the velocity or acceleration sensor may be used to periodically recalibrate (i.e., change) the output from the second acoustic source(s).

According to another embodiment, a method is provided where based on computer simulations and calibration experiments, a plurality of desirable or optimized canceling signals are found, at least one each for a plurality of couplets of different rock compressional slownesses expected to be encountered by the borehole tool and drilling mud properties in which the tool is expected to operate. For example, the formation slownesses expected to be encountered can be broken into two, three, four or more ranges, and the mud types can be identified as water-based mud, oil-based mud, and, if desired extra-heavy mud. Desirable canceling signal can be generated for a plurality of couplets of formation slowness and mud type. During use, the first source and the selected second acoustic source (based on knowledge of mud type and an estimate of adjacent formation slowness from other information such as adjacent wells or previously drilled segments of the borehole) are fired, and the resulting pressure signals are recorded by a plurality of axially spaced detectors. The signal information is then processed, e.g., using Slowness Time Coherency processing, to obtain information regarding the property of the formation (rock) in which the tool is being run. It should be appreciated that as the tool is run in the borehole, the choice of the appropriate second canceling acoustic source signal can be changed based on known information or based on the results obtained regarding formation slowness. If the mud parameters change along the length of the borehole (due to pressure and/or temperature changes) or if the tool is run in another borehole with perhaps a different mud type, the choice of the appropriate second canceling acoustic signal will be changed based on the changed couplet. Optionally, the tool may include a vibration or velocity or acceleration sensor (e.g., an accelerometer) that records velocity information each time the first and second acoustic sources are fired. The information recorded from the velocity or acceleration sensor may be used to periodically recalibrate (i.e., change) the output from the second acoustic source(s).

In another embodiment, a method is provided where based on computer simulations and calibration experiments, a plurality of desirable or optimized canceling signals are found, at least one each for a plurality of triplets of different rock compressional slownesses expected to be encountered by the borehole tool, drilling mud properties in which the tool is expected to operate, and borehole diameters in which the tool is expected to operate. For example, the formation slownesses expected to be encountered can be broken into two, three, four or more ranges, the mud types can be identified as water-based mud, oil-based mud, and, if desired extra-heavy mud, and the borehole diameters can be broken into borehole diameters expected to be encountered such as six inch, eight inch, and ten inch wellbores. Desirable canceling signal can be generated for a plurality of triplets of formation slowness, mud type and borehole diameter. During use, the first source and the selected second acoustic source (based on knowledge of mud type, the borehole diameter and an estimate of adjacent formation slowness from other information such as adjacent wells or previously drilled segments of the borehole) are fired, and the resulting pressure signals are recorded by a plurality of axially spaced detectors. The signal information is then processed, e.g., using Slowness Time Coherency processing, to obtain information regarding the property of the formation (rock) in which the tool is being run. It should be appreciated that as the tool is run in the borehole, the choice of the appropriate second canceling acoustic source signal can be changed based on known information, or based on the results obtained regarding formation slowness, or based on a change of mud parameters due to pressure and/or temperature changes. If the tool is run in another borehole with perhaps a different borehole diameter and/or different mud type, and/or different formation slowness, the choice of the appropriate second canceling acoustic signal will be changed based on a changed triplet. Optionally, the tool may include a vibration or velocity or acceleration sensor (e.g., an accelerometer) that records velocity information each time the first and second acoustic sources are fired. The information recorded from the velocity or acceleration sensor may be used to periodically recalibrate (i.e., change) the output from the second acoustic source(s).

In one embodiment, rather than firing the sources substantially simultaneously, the sources are fired at different times (i.e., milliseconds or more apart). Pressure signals at the receivers (and optionally velocity signals at the velocity or acceleration sensor) are recorded resulting from the firing of each of the sources. Where the second source is fired with a previously determined canceling signal, the signals resulting from the firing of the second source may then be added (subtracted) from the signals resulting from the firing of the first source to generate a pressure signal that would have been recorded if both sources were fired at the same time. The signal information is then processed, e.g., using Slowness Time Coherency processing, to obtain information regarding the property of the formation (rock) in which the tool is being run. In one embodiment, all of the information is recorded in tool memory, and when the tool is pulled out of the borehole, the information is processed by adding (subtracting) and by running the STC processing. In another embodiment, at least the subtraction processing is done downhole on the tool, and the results are conveyed to the surface in a desired manner.

In another embodiment, the sources are fired at different times and the second source is fired with a "test signal" such as a unit pulse. In this case, both the pressure trace as well as the tool vibration (velocity or acceleration sensor) trace are recorded. A canceling signal is synthesized as a superposition of copies of the "test signal" with different weights and delays so as to maximally cancel the net tool vibration.

Then the pressure traces corresponding to that synthesized canceling signal are computed and added to the traces obtained from the first acoustic source firing. The resulting pressure traces are processed to determine properties of the formation.

There have been described and illustrated herein several embodiments of borehole tools using an acoustic source and a second noise canceling acoustic source, and methods associated therewith. While particular embodiments have been described, it is not intended that the disclosure be limited thereto, and it is intended that the claims be as broad in scope as the art will allow and that the specification be read likewise. Thus, while particular signal processing (i.e., STC) was described in order to find particular formation parameters (i.e., slownesses), it will be appreciated that the same or other processing could be used to obtain other formation parameters. Also, while particular numbers of detectors were described, different numbers of detectors can be used. Similarly, while a particular distance between the sources was described, different distances could be used. Further, while the borehole tool was described in conjunction with a drill collar, it will be appreciated that the sources and detectors can be used in conjunction with a wireline-type tool rather than a drilling-type tool, with the sources and detectors located along the tool housing. It will therefore be appreciated by those skilled in the art that yet other modifications could be made. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An acoustic logging tool for use in a borehole traversing a formation, comprising:
    a) a first acoustic source that generates an acoustic signal primarily directed into the formation, said acoustic signal including a noise signal carried axially along the tool;
    b) a second acoustic source adapted to generate a noise canceling signal along the tool that actively cancels said noise signal; the second acoustic source is located between the first acoustic source and a plurality of acoustic sensors;
    c) the plurality of acoustic sensors axially spaced from each other along the tool and spaced from said first acoustic source and said second acoustic source, said acoustic sensors receiving and recording indications of pressure signals resulting from said acoustic signal and said noise canceling signal;
    d) at least one vibration sensor spaced between the first and second acoustic source and the plurality of acoustic sensors, the at least one vibration sensor adapted to measure velocity or acceleration of said noise signal and said noise canceling signal; and using said first acoustic source and said vibration sensor in calibrating said tool in order to determine a form of said noise canceling signal.

2. An acoustic logging tool according to claim 1, wherein: said at least one vibration sensor is located between said second acoustic source and said plurality of acoustic sensors.

3. An acoustic logging tool according to claim 1, wherein: said second acoustic source is adapted to direct said noise canceling signal axially.

4. An acoustic logging tool according to claim 1, wherein: said first acoustic source and said second acoustic source are adapted to substantially simultaneously respectively generate said acoustic signal and said noise canceling signal.

5. An acoustic logging tool according to claim 1, further comprising:
    a processor unit that generates from said indications of pressure signals an indication of a property of the formation.

6. An acoustic logging tool according to claim 5, wherein: said indication of a property of the formation is an indication of a formation slowness.

7. An acoustic logging tool according to claim 6, wherein: said formation slowness is at least one of rock compressional slowness and rock shear slowness.

8. An acoustic logging tool according to claim 5, wherein: said first acoustic source and said second acoustic source are adapted to respectively generate said acoustic signal and said noise canceling signal at least one millisecond apart such that said plurality of acoustic sensors substantially separately sense and record signals resulting from said acoustic signal and said noise canceling signal, and said processor unit is adapted to add or subtract said signals resulting from said acoustic signal and said noise canceling signal.

9. An acoustic logging tool according to claim 1, wherein: said noise canceling signal generated by said second acoustic source is a selected signal of a plurality of different noise canceling signals generated for different formation slownesses.

10. An acoustic logging tool according to claim 9, wherein:
    said plurality of different noise canceling signals generated for different formation slownesses includes at least three different noise canceling signals.

11. An acoustic logging tool according to claim 1, wherein:
    said noise canceling signal generated by said second acoustic source is a selected signal of a plurality of different noise canceling signals generated for different borehole diameters.

12. An acoustic logging tool according to claim 1, wherein:
    said noise canceling signal generated by said second acoustic source is a selected signal of a plurality of different noise canceling signals generated for use of the acoustic logging tool in boreholes having different mud types.

13. An acoustic logging tool for use in a borehole traversing a formation, comprising:
    a) a drill;
    b) a collar;
    c) a first acoustic source located on said collar that generates an acoustic signal primarily directed into the formation, said acoustic signal including a noise signal carried axially along the collar;
    d) a second acoustic source located on said collar adapted to generate a noise canceling signal along the collar that actively cancels said noise signal; the second acoustic source is located between the first acoustic source and a plurality of acoustic sensors;
    e) the plurality of acoustic sensors axially spaced from each other along the collar and spaced from said first acoustic source and said second acoustic source, said acoustic sensors receiving and recording indications of pressure signals resulting from said acoustic signal and said noise canceling signal;

f) at least one vibration sensor spaced from the first and second acoustic source and the plurality of acoustic sensors, the at least one vibration sensor adapted to measure velocity or acceleration of said noise signal and said noise canceling signal; and g) a processor unit that generates from said indications of pressure signals an indication of a property of the formation, wherein said noise canceling signal generated by said second acoustic source is a selected signal of a plurality of different noise canceling signals generated for at least one of (i) different formation slownesses, (ii) different borehole diameters, and (iii) use of the acoustic logging tool in boreholes having different mud types.

14. An acoustic logging tool according to claim 13, wherein:
said noise canceling signal is a selected signal of a plurality of different noise canceling signals generated for at least two of said (i) different formation slownesses, (ii) different borehole diameters, and (iii) use of the acoustic logging tool in boreholes having different mud types.

15. An acoustic logging tool according to claim 13, wherein:
said first acoustic source and said second acoustic source are adapted to substantially simultaneously respectively generate said acoustic signal and said noise canceling signal.

16. An acoustic logging tool according to claim 13, wherein:
said indication of a property of the formation is an indication of a formation slowness.

17. A method of investigating an earth formation traversed by a borehole, comprising:
a) providing a borehole tool including (i) a first acoustic source that generates an acoustic signal primarily directed into the formation, said acoustic signal including a noise signal carried axially along the tool, (ii) a second acoustic source adapted to generate a noise canceling signal along the tool that actively cancels said noise signal; the second acoustic source is located between the first acoustic source and a plurality of acoustic sensors, and (iii) the plurality of acoustic sensors axially spaced from each other along the tool and spaced from said first acoustic source and said second acoustic source;

b) firing said first acoustic source thereby generating the acoustic signal and firing said second acoustic source thereby generating the noise canceling signal;

c) recording at said plurality of acoustic sensors a plurality of indications of pressure signals resulting from said acoustic signal and said noise canceling signal;

d) processing said plurality of indications and providing therefrom an indication of a property of the formation; and e) said borehole tool further includes (iv) at least one vibration sensor spaced between the first and second acoustic source and the plurality of acoustic sensors, the at least one vibration sensor adapted to measure velocity or acceleration of said noise signal and said noise canceling signal and using said first acoustic source and said vibration sensor in calibrating said tool in order to determine a form of said noise canceling signal.

18. A method according to claim 17, wherein:
said indication of a property of the formation is an indication of at least one of a formation compressional slowness and formation shear slowness.

19. A method according to claim 17, wherein:
said firing comprises firing said first acoustic source and said second acoustic source substantially simultaneously.

20. A method according to claim 18, wherein:
said noise canceling signal generated by said second acoustic source is a selected signal of a plurality of different noise canceling signals generated for at least one of (i) different formation slownesses, (ii) different borehole diameters, and (ii) use of the acoustic logging tool in boreholes having different mud types.

21. An acoustic logging tool according to claim 1, wherein the vibration sensor is an accelerometer.

* * * * *